Oct. 10, 1950        T. FAHRNER        2,524,901

WIDE RANGE RADIATION INTENSITY METER

Filed May 12, 1949

WITNESSES:

INVENTOR
Ted Fahrner.
BY
ATTORNEY

Patented Oct. 10, 1950

2,524,901

UNITED STATES PATENT OFFICE 2,524,901

WIDE RANGE RADIATION INTENSITY METER

Ted Fahrner, Whittier, Calif., assignor to Westinghouse Electric Corporation, East Pittsburgh, Pa., a corporation of Pennsylvania Application May 12, 1949, Serial No. 92,760

5 Claims. (Cl. 250—83.6)

This invention relates to apparatus for measuring radiation intensity of nuclear or atomic radiations, such as alpha, beta and gamma rays, and more particularly, to a meter that will measure such radiations over a wide intensity range.

A common type of meter for measuring weak, short wave radiations embodies a Geiger Müller counter tube that operates at a constant voltage. Since such a tube has a very high current amplification ratio, that is, of the order of $10^9$, it is very sensitive to weak radiations and is especially suitable for measuring weak gamma rays, X rays, alpha rays and other nuclear or atomic radiations. However, when such tube is subjected to a strong radiation source, the current output reaches saturation values and the life of the counter tube is greatly reduced. Such tube is generally operated in the Geiger region, that is, the potential region of the characteristic curve of voltage versus pulse size in which the size of the pulse discharged through the tube is independent of the number of ions. All pulses when viewed on an oscilloscope will appear to be of the same height when the tube is operated in this region.

An object of my invention is to provide a radiation intensity meter employing a Geiger Müller counter tube, which meter is devoid of the disadvantages named above;

A more specific object of my invention is to provide a radiation intensity meter including a Geiger Müller counter tube that is equally adapted to measure weak radiations or strong radiations without the danger of saturation and shortening of the life of the tube as the result of exposure to strong radiations, and providing an extended range of measurement as compared to that obtainable by a tube operated in the "Geiger region."

An even more specific object of this invention is to provide a wide range radiation intensity meter employing a Geiger Müller counter tube, which meter is operated in the "proportional region" instead of the "Geiger region" and which includes current limiting means for preventing saturation of the tube.

In its broadest aspects, the present invention comprises a Geiger Müller counter tube which is operated in the "proportional region" and the current through which is limited by means of a regulator in series with the counter tube, the regulator increasing its resistance, thereby reducing the voltage across the counter tube if the radiation intensity increases. The voltage across the regulator, therefore, is a function of radiation intensity and its measuring voltmeter can be calibrated in terms of Roentgens per minute or other units of radiation intensity.

The novel features that I consider characteristic of my invention are set forth with particularity in the appended claims. The invention itself, however, both as to its organization and its method of operation together with additional objects and advantages thereof will best be understood from the following description of a specific embodiment when read in connection with the accompanying drawing; in which, Fig. 1 is a characteristic curve of amplification versus voltage of a Geiger Müller counter tube which may be employed in the practice of my invention and showing the limits of the "proportional" and "Geiger" regions;

Figure 1:
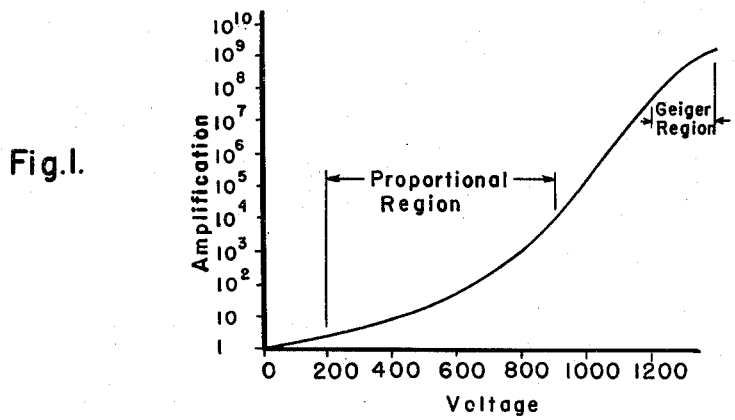

Referring more particularly to Fig. 1 of the drawing which shows a graph illustrating the amplification versus voltage characteristic of a Geiger Müller tube, there will be noted therefrom the limits of the "proportional region" and "Geiger region." These regions are labeled on the graph and as will be apparent therefrom, the voltage is almost proportional to the log of the amplification throughout the "proportional region." The "proportional region" is commonly known as voltage range over which the pulse size is proportional to the number of ions formed in the initial ionizing event. In this region, the gas amplification is constant for all pulses at any one voltage. The gas amplification represents the number of additional ions produced by each electron produced in the primarily ionizing event as it travels to the center wire. The "proportional region" has for its lower limit the lowest voltage at which gas amplification takes place and for its upper limit the Geiger threshold. In conventional radiation measuring circuits, the Geiger Müller tube is operated in the "Geiger region" which is defined hereinabove.

Figure 2:
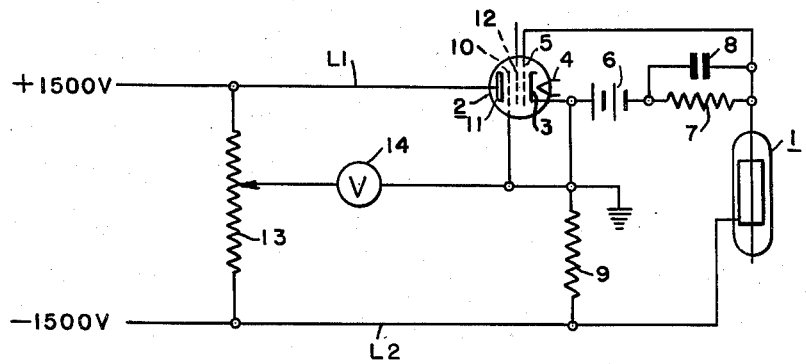
Fig. 2 is a circuit diagram of an embodiment of my invention.
Figure 2:

Fig. 2 shows a schematic or circuit diagram of a wide range radiation intensity meter involving the principles of the present invention, and employing a Geiger Müller counter tube 1 of any well known construction. A common type of tube is one having a glass envelope enclosing a thin central wire of tungsten or other suitable metal, forming the anode, and a metal cylindrical cathode coaxially disposed with respect to the central wire. The tube is generally evacuated and then refilled with one of the rare gases plus a small percentage of ammonia or an organic vapor for quenching the discharge. A high positive voltage is applied to the center wire electrode and the counter detects the passage of charged particles through the volume between the electrodes, which passage is manifested in the form of electrical impulses.

In series relationship with the counter tube 1 is a grid controlled electron discharge tube 2. The tube 2 is preferably a radio frequency pentode having a sharp cutoff. An R. C. A. tube type 6AC7 is suitable. A direct current source of potential denoted by the symbols + and − is applied across the line terminals L1, L2. 1500 volts is a suitable value. Thus the tube 2 and Geiger Müller counter tube 1 are connected in series with the source. Tube 2 includes a cathode 3 which may be of the indirectly heated type, that is, heated by a heater wire 4 energized by a suitable source of heater potential (not shown). The control grid 5 is at a negative potential with respect to the cathode by an amount equal to the voltage of a grid biasing battery 6 and the IR drop across a grid resistor 7 which is shunted by a condenser 8. Grid resistor 7 may be of the order of 4.7 megohms and the condenser 8 may have a capacity of the order of .01 mfd. A load resistor 9 is connected between the cathode and line terminal L2 and which may be of the order of 440,000 ohms. Connected to cathode 3 of tube 1 is a suppressor grid 10. The tube also includes a plate or anode 11, which is connected to line terminal L1, and a screen grid 12.

A suitable screen grid supply voltage, preferably of the order of +95 volts, is applied to screen grid 12. A voltage divider or bleeder resistor 13 is connected across line terminals L1 and L2 and a variable tap is connected therefrom to a radiation meter 14 which is grounded. The meter 14 may be in the form of a microammeter having 0–100 microammeter movement and series resistor to cause a reading of 0–500 volts full scale.

After a suitable voltage is applied to the screen grid as described hereinbefore, the variable tap on resistor 13 may be adjusted to provide a zero set to meter 14 so that for a given screen grid supply voltage and zero radiation intensity, the meter 14 will be adjusted to read zero.

In the operation of the circuit, the Geiger Müller tube 1 is operated in the "proportional region" and the current flowing therethrough is limited by means of the electron discharge tube 2 connected in series therewith, which tube serves as a current regulating tube. That is, if the gamma rays or other nuclear or atomic radiations falling upon tube 1 increase in intensity, the current flow through tube 1 will increase and the voltage drop across resistor 7 likewise will increase in proportion, making the control grid 5 of the electron discharge tube 2 more negative with respect to the cathode. The negative control grid will repel the electrons emitted by the cathode, and will reduce the current flow between the cathode and the anode of the electron discharge tube 2 or, in other words, it will increase the tube resistance. This increase in resistance, in turn, will reduce the voltage across the counter tube 1. Therefore, the voltage across the regulator tube 2 is a function of the radiation intensity falling on tube 1. Meter 14 measures the potential drop across the regulator tube 2. Since the potential drop across the regulator tube varies in response to the current through the counter, the meter 14 may be calibrated in counts per minute or in terms of radiation intensity, as in Roentgens per minute.

Figure 3:
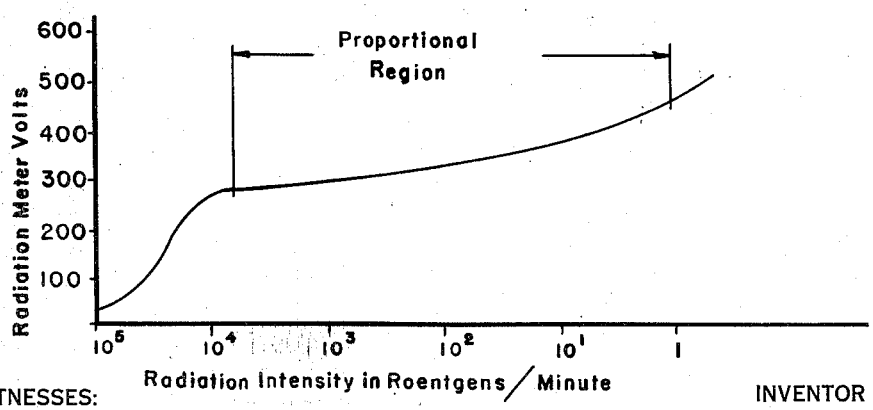
Fig. 3 is a characteristic curve of potential versus radiation intensity in Roentgens per minute over the proportional region as measured by the meter shown in Fig. 2 in one embodiment of my invention.

As will appear from Fig. 3 wherein the potential reading of meter 14 is plotted against radiation intensity in Roentgens per minute, a practically straight-line relationship exists between the values $10^{-3}$ Roentgens/minute and 1 Roentgen/minute which are within the "proportional region." A logarithmic scale 3 or 4 decades long may be used. In the region between $10^{-4}$ Roentgens and $10^{-5}$ Roentgens (not shown) which comprises the "Geiger region," the curve falls off somewhat sharply. It will therefore appear that the range within the "proportional region" is 3 or 4 decades as compared to that of 1 decade for the "Geiger region." Fig. 3 shows that in the proportional region the change in meter voltage is proportional to the logarithm of radiation intensity, permitting 4 decades of intensity measurement from zero to full scale of a meter. The useful range of the instrument when operated in the "proportional region" is considerably greater than that in the "Geiger region." Stated differently, if the tube when operated in the "Geiger region" is good for a factor of 100 below maximum intensity, it would be good for a factor of greater than 10,000 when operated in accordance with the present invention and within the "proportional region."

With the above described metering system, therefore, it should be possible to measure high radiation intensity without shortening the life of the counter tube as normally occurs from concurrent high voltage and high current.

It will be apparent that other regulating tubes may be substituted for the pentode illustrated and still provide the function of increasing the resistance of the regulator tube and reducing the voltage across the counter tube 1 as the radiation intensity increases.

Thus it will be seen that I have provided a highly efficient and reliable radiation intensity meter which is suitable for measuring short wave radiations over a very wide range as compared to conventional meters, and wherein a regulator tube is provided in series with a Geiger Müller counter tube for limiting the current flow through the counter tube, the latter being operated in the "proportional region." Measurement of the radiation intensity is provided by means of a meter which is indicative of the voltage drop across the regulator tube.

While I have illustrated and described a certain specific embodiment of my invention, it will be understood that this is by way of illustration only, and that various changes and modifications may be made within the contemplation of my invention and within the scope of the following claims.

I claim as my invention:

1. A wide range radiation intensity meter comprising connections for applying a direct current potential, a Geiger Müller counter tube and a grid controlled electron discharge tube connected in series across said connections, said counter tube being operated in the "proportional region," and means for measuring the voltage drop across said grid controlled electron discharge tube said voltage drop being a function of radiation intensity falling on said counter tube.

2. A short wave radiation measuring device suitable for operation over a wide intensity range, comprising, in combination, a Geiger Müller counter tube, a grid controlled electron discharge tube connected in series therewith across terminals to which can be applied a D. C. potential and including an anode, control grid and cathode, a grid biasing resistor connected in series with said counter tube and with said electron discharge tube, a voltage divider resistor having an adjustable tap and connected across said source of D. C. potential, and a radiation measuring meter tapped to said voltage divider resistor and connected across said electron discharge tube whereby as the radiation falling upon the counter tube increases, said control grid will become more negative with respect to said cathode, thereby increasing the resistance of said electron discharge tube and reducing the counter tube voltage whereby said meter will measure the amount of such increase in resistance which is a function of radiation intensity falling upon said Geiger Müller counter tube.

3. Apparatus recited in the next preceding claim wherein said electron discharge tube consists of a radio frequency pentode having a sharp cut-off.

4. Apparatus recited in claim 2 wherein said load resistor is of the order of 440,000 ohms, said voltage divider resistor is of the order of 1 megohm, and said source of D. C. potential is of the order of 1,500 volts.

5. Apparatus recited in claim 2 wherein said load resistor is of the order of 440,000 ohms, said voltage divider resistor is of the order of 1 megohm, and said source of D. C. potential is of the order of 1,500 volts, and wherein said electron discharge tube consists of a pentode having a screen grid which is energized with a positive potential of the order of 95 volts and wherein for such voltage said radiation meter is zero-set by varying said adjustable tap on said voltage divider.

TED FAHRNER.

REFERENCES CITED

The following references are of record in the file of this patent:

Bousquet, Electronic Industries, September 1946, pp. 88–89.

Brown, Nucleonics, October 1948, page 53.